(12) United States Patent
Tsugane et al.

(10) Patent No.: US 12,307,907 B2
(45) Date of Patent: May 20, 2025

(54) INFORMATION PROCESSING DEVICE AND INFORMATION PROCESSING METHOD

(71) Applicant: KDDI CORPORATION, Tokyo (JP)

(72) Inventors: Daisuke Tsugane, Tokyo (JP); Tomohiro Oohashi, Tokyo (JP); Hiroshi Kawana, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 215 days.

(21) Appl. No.: 18/105,440

(22) Filed: Feb. 3, 2023

(65) Prior Publication Data

US 2023/0316934 A1 Oct. 5, 2023

(30) Foreign Application Priority Data

Mar. 31, 2022 (JP) ................................ 2022-059471

(51) Int. Cl.
*G08G 5/30* (2025.01)
*H04W 72/0453* (2023.01)

(52) U.S. Cl.
CPC .......... *G08G 5/30* (2025.01); *H04W 72/0453* (2013.01)

(58) Field of Classification Search
CPC ... G08G 5/003; H04W 72/0453; H04W 28/24
See application file for complete search history.

(56) References Cited

U.S. PATENT DOCUMENTS

2017/0046962 A1* 2/2017 Shipley .................. G01C 23/00
2019/0371185 A1* 12/2019 Shorter, Jr. ............ G08G 5/0026
2020/0219402 A1 7/2020 Shao et al.
2021/0241633 A1* 8/2021 Shorter, Jr. ........... G08G 5/0013
2022/0015102 A1* 1/2022 Gallagher ........... H04B 7/15542
2023/0298473 A1* 9/2023 Shorter, Jr. .......... G08G 5/0026
701/528

FOREIGN PATENT DOCUMENTS

| JP | 2019-059258 A | 4/2019 |
| JP | 2020-201849 A | 12/2020 |
| JP | 2021-157624 A | 10/2021 |

OTHER PUBLICATIONS

Office Action of corresponding Japanese Patent Application No. 2022-059471, dated Sep. 6, 2022, with English translation.

* cited by examiner

*Primary Examiner* — Richard M Camby
(74) *Attorney, Agent, or Firm* — Foley & Lardner LLP

(57) ABSTRACT

An operation plan management device includes a plan information acquisition unit that acquires operation plan information, and scheduled operation range information, a base station specifying unit that specifies a base station that performs wireless communication with the flight device on the basis of the scheduled operation range, an interference amount acquisition unit that acquires an estimated value of the interference amount of radio waves that the flight device imparts to the wireless communication performed by nearby base stations when the flight device performs the wireless communication while flying in the scheduled operation range, a determination unit that determines whether the estimated value does not exceed a predetermined allowable range of interference amount of radio waves, and an operation permission unit that permits operation of the flight device indicated by the operation plan information upon determining that the estimated value does not exceed the allowable range.

13 Claims, 6 Drawing Sheets

FIG. 3

| OPERATOR ID | FLIGHT DEVICE ID | MODULE ID | OPERATION PLAN ||||||
| | | | SCHEDULED OPERATION DATE/TIME ||| ... | SCHEDULED OPERATION RANGE || USE | REQUIRED PERFORMANCE |
| | | | SCHEDULE OPERATION DATE | OPERATION START TIME | OPERATION END TIME | | START POINT POSITION | END POINT POSITION | | |
| U0001 | 1234 | A | 2022/3/18 | 10:00 | 12:00 | ... | N:35.… E:139.… H:20m | N:35.… E:139.… H:30m | SURVEY-ING | 5Mbps |
| U0002 | 5678 | B | 2022/3/19 | 13:00 | 14:00 | ... | N:36.… E:139.… H:50m | N:36.… E:139.… H:50m | AERIAL PHOTO-GRAPHY | 3Mbps |
| ... | ... | ... | ... | ... | ... | ... | ... | ... | ... | ... |

FIG. 4

| BASE STATION ID | RAT | FREQUENCY BAND | MODULATION METHOD | LOCATION INFORMATION | CORRESPONDING DISTANCE | TOTAL RESOURCE AMOUNT | ... |
|---|---|---|---|---|---|---|---|
| B1 | LTE | 2GHz | 64QAM | N:35.⋯, E:139.⋯, H:20m | 100m | 100 | ... |
| B2 | LTE | 800MHz | QPSK | N:35.⋯, E:140.⋯, H:10m | 250m | 50 | ... |
| B3 | LTE | 2GHz | 64QAM | N:35.⋯, E:139.⋯, H:20m | 100m | 100 | ... |
| ... | ... | ... | ... | ... | ... | ... | ... |

FIG. 5

| BASE STATION ID | TIME PERIOD | FLIGHT DEVICE ID | FREQUENCY BAND USED | ALLOCATION RESOURCE AMOUNT | TRANSMISSION POWER PARAMETER | ... |
|---|---|---|---|---|---|---|
| B1 | 10:00~11:00 | U0012 | 2GHz | 10 | $\alpha_{p+1}, P_{0p+1}$ | ... |
| | | U0013 | 2GHz | 10 | $\alpha_{p+1}, P_{0p+1}$ | ... |
| | 11:00~12:00 | U0010 | 2GHz | 5 | $\alpha_{default}, P_{0default}$ | ... |
| | ... | ... | ... | ... | ... | ... |
| B2 | 10:00~11:00 | U0020 | 800MHz | 5 | $\alpha_{default}, P_{0default}$ | ... |
| | | U0021 | 800MHz | 10 | $\alpha_{p+1}, P_{0p+1}$ | ... |
| | 11:00~12:00 | U0020 | 800MHz | 5 | $\alpha_{default}, P_{0default}$ | ... |
| | ... | ... | ... | ... | ... | ... |
| ... | ... | ... | ... | ... | ... | ... |

INFORMATION PROCESSING DEVICE AND INFORMATION PROCESSING METHOD

CROSS REFERENCE TO RELATED APPLICATION

Priority is claimed on Japanese Patent Application No. 2022-059471, filed Mar. 31, 2022, the content of which is incorporated herein by reference.

BACKGROUND OF THE INVENTION

Field of the Invention

The present invention relates to an information processing device and an information processing method.

Description of Related An

Techniques for flying a flight device along a predetermined flight route are widespread. A flight device can communicate with an external device using wireless communication, and can transmit data generated during flight to the external device (see, for example, Japanese Unexamined Patent Application Publication No. 2020-201849).

SUMMARY OF THE INVENTION

Accordingly, an example of the object of the present invention is to operate a flight device that performs good wireless communication while suppressing interference to wireless communication performed by nearby base stations due to radio waves emitted by the flight device.

An information processing device according to the first aspect of the present invention includes: a plan information acquisition unit that acquires operation plan information including flight device identification information for identifying a flight device that is scheduled to fly, scheduled operation date and time information that indicates the date and time that the flight device is scheduled to fly, and scheduled operation range information that indicates the scheduled operation range that the flight device is scheduled to fly; a base station specifying unit that specifies a base station that performs wireless communication with the flight device on the basis of the scheduled operation range; an interference amount acquisition unit that acquires an estimated value of the interference amount of radio waves that the flight device imparts to the wireless communication performed by nearby base stations, which are base stations in the vicinity of the base station, when the flight device performs the wireless communication while flying in the scheduled operation range; a determination unit that, when the flight device performs the wireless communication while flying in the scheduled operation range, determines whether the estimated value does not exceed a predetermined allowable range of interference amount of radio waves imparted by the flight device to the wireless communication performed by the nearby base stations; and an operation permission unit that permits operation of the flight device indicated by the operation plan information upon determining that the estimated value does not exceed the allowable range.

The estimated value may be an estimated value of the interference amount of radio waves imparted by the flight device to the wireless communication performed by the nearby base stations when the communication performance of the wireless communication in the case of the flight device performing the wireless communication while flying in the scheduled operation range satisfies a predetermined communication performance.

The information processing device may also include a resource amount specifying unit that specifies a new allocation resource amount that is required to achieve the predetermined communication performance and is the amount of wireless communication resources allocated to the flight device by the base station, and an allocatable resource amount that is the amount of resources that can be allocated to the flight device, the determination unit may determine whether it is possible to allocate resources corresponding to the new allocation resource amount to the flight device on the basis of the allocatable resource amount and the new allocation resource amount determined by the resource amount specifying unit, and the operation permission unit may permit operation of the flight device when the determination unit determines that the resources corresponding to the new allocation resource amount can be allocated to the flight device, and that the estimated value does not exceed the allowable range.

The operation plan information may include module identification information to identify a communication module for the flight device to perform the wireless communication, and the resource amount specifying unit may specify the new allocation resource amount on the basis of at least one of the communication standard corresponding to the wireless communication, the frequency band used and the modulation method, which are specifications of the wireless communication performed by the communication module and specified on the basis of the module identification information included in the operation plan information.

The information processing device further includes a storage unit that stores the operation plan information corresponding to each of a plurality of flight devices, wherein the resource amount specifying unit, referring to the plurality of pieces of operation plan information stored in the storage unit, may specify other flight devices that will fly in the scheduled operation range indicated by the operation plan information on the date and time when the flight device indicated by the operation plan information acquired by the plan information acquisition unit is scheduled to fly, and may specify the allocatable resource amount on the basis of the amount of wireless communication resources allocated to the other specified flight devices on the date and time.

The resource amount specifying unit may specify an allocation resource amount allocated to each of all the flight devices performing the wireless communication with the base station including the flight device; and the interference amount acquisition unit may acquire the estimated value of the interference amount of radio waves imparted by all the flight devices to the wireless communication performed by the nearby base stations on the basis of the allocation resource amount specified by the resource amount specifying unit and allocated to each of all the flight devices.

The operation plan information may include use information indicating the use of the flight device in flight; and the information processing device may further include a communication performance specifying unit that specifies the predetermined communication performance on the basis of the use indicated by the use information included in the operation plan information.

The operation plan information may include altitude information indicating the altitude at which the flight device flies; and the interference amount acquisition unit may acquire the estimated value of the interference amount when the communication performance in the case of the flight device performing the wireless communication while flying at the altitude indicated by the altitude information included in the operation plan information satisfies the predetermined communication performance.

The interference amount acquisition unit may acquire the estimated value of the interference amount of radio waves imparted by the flight device to the wireless communication performed by the nearby base stations on the basis of a type of the base station corresponding to an openness of a space in an area covered by the base station.

The information processing device may further include: an instruction value specifying unit that, on the basis of information indicating a relationship between the interference amount and an instruction value that instructs a transmission power amount of the wireless transmission to be output to the flight device, and a relationship between the communication performance of the wireless transmission and the instruction value, specifies the instruction value that causes the flight device to output transmission power expected to provide communication performance that is below a threshold value of the interference amount while exceeding a predetermined communication performance; and a notification unit that notifies the base station notifying the flight device of information indicating the instruction value of information for causing the flight device to transmit the instruction value.

The interference amount acquisition unit may acquire an estimate of the interference amount for each of the plurality of base stations that perform the wireless communication with the flight device; the instruction value specifying unit may specify the instruction value corresponding to each of the plurality of base stations on the basis of the estimate of the interference amount specified for each base station; and the notification unit may notify each of the plurality of base stations of information for causing to transmit the instruction value specified for the base station.

The interference amount acquisition unit may acquire an estimated value of the interference amount at each of the plurality of base stations that communicate wirelessly with the flight device; the determination unit may determine whether the estimated value does not exceed the allowable range at the each of the plurality of base stations by comparing the threshold value of the interference amount corresponding to the each of the plurality of base stations and the estimated value of the interference amount; and the operation permission unit may permit the operation of the flight device indicated by the operation plan information when the determination unit determines that the estimated value does not exceed the allowable range at the each of the plurality of base stations.

The information processing method according to the second aspect of the present invention, executed by a computer, includes: acquiring operation plan information including flight device identification information for identifying a flight device that is scheduled to fly, scheduled operation date and time information that indicates the date and time that the flight device is scheduled to fly, and scheduled operation range information that indicates the scheduled operation range that the flight device is scheduled to fly; specifying a base station that performs wireless communication with the flight device on the basis of the scheduled operation range; acquiring an estimated value of the interference amount of radio waves that the flight device imparts to the wireless communication performed by nearby base stations, which are base stations in the vicinity of the base station, when the flight device performs the wireless communication while flying in the scheduled operation range; determining, when the flight device performs the wireless communication while flying in the scheduled operation range, whether the estimated value does not exceed a predetermined allowable range of interference amount of radio waves imparted by the flight device to wireless communications performed by the nearby base stations; and permitting operation of the flight device indicated by the operation plan information upon determining that the estimated value does not exceed the allowable range.

BRIEF DESCRIPTION OF THE DRAWINGS

FIG. 3 is a diagram showing an example of operation plan information.

FIG. 4 is a diagram showing an example of base station information.

FIG. 5 is a diagram showing an example of resource allocation information.

DETAILED DESCRIPTION OF THE INVENTION

[Overview of Operation Plan Management System S]

Figure 1:
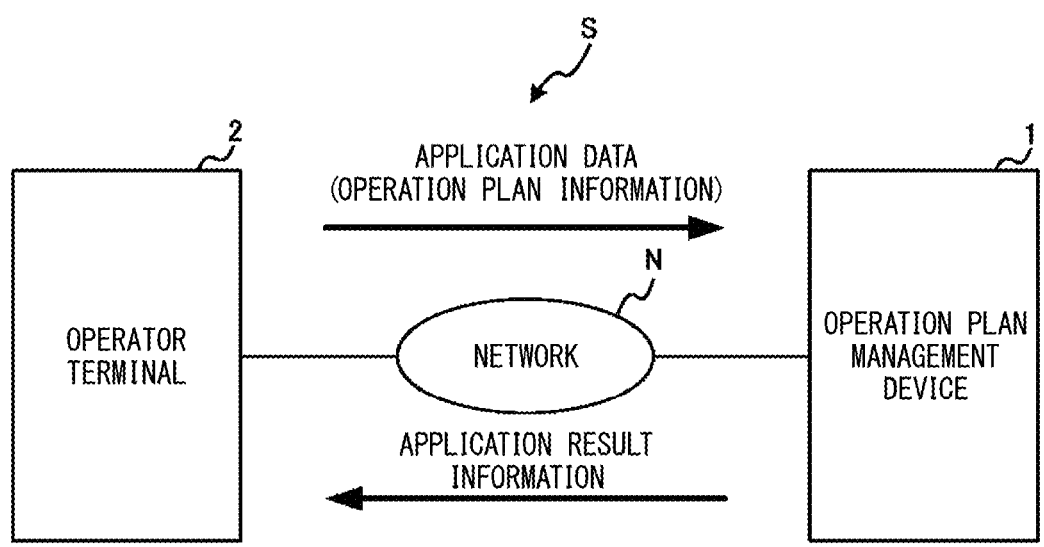
FIG. 1 is a diagram showing an overview of the operation plan management system.

FIG. 1 is a diagram showing an overview of the operation plan management system S. The operation plan management system S is a system that manages the operation plan of a flight device that is an unmanned aerial vehicle such as a drone.

The operation plan management system S is provided with an operation plan management device 1 and an operator terminal 2. The operation plan management device 1 is an information processing device communicably connected to the operator terminal 2 via a wired or wireless communication network N.

The operation plan management device 1 is, for example, a computer operated by an Unmanned Aircraft Systems Service Provider (UASSP) as an operation manager managing the operations of flight devices flying in a predetermined area.

The operation manager is, for example, a predetermined telecommunications carrier that provides a wireless communication line such as a mobile phone line constructed by a plurality of base stations installed in a predetermined area.

The operation plan management device 1 manages operation plans of flight devices that fly over a predetermined area using the wireless communication line provided by the predetermined telecommunications carrier.

The operator terminal 2 is a terminal used by an operator of a flight device (Unmanned Aircraft System Operator: UASO), and is, for example, a computer such as a personal computer, a smart phone, or a tablet. The operator terminal 2 is used to apply for an operation plan to the operation plan management device 1.

The operation plan management device 1 acquires flight application data of a flight device from the operator terminal 2. The application data includes operation plan information that includes a flight device ID that is flight device identification information for identifying the flight device that is scheduled to fly, scheduled operation date and time information that indicates the date and time that the flight device is scheduled to fly, and scheduled operation range information that indicates the scheduled operation range that the flight device is scheduled to fly.

After acquiring the application data, the operation plan management device 1 specifies the base station that will perform wireless communication with the flight device among the multiple base stations on the ground, on the basis of the scheduled operation range indicated by the scheduled operation range information included in the operation plan information. The operation plan management device 1 acquires an estimated value of the interference amount of radio waves that the flight device will impart to wireless communications conducted by nearby base stations, which are base stations in the vicinity of the specified base station, when the flight device performs wireless communication while flying in the scheduled operation range.

The estimated value of the interference amount is, for example, a value calculated in advance based on the transmission power when the flight device outputs radio waves. A nearby base station is a base station with which the flight device does not perform wireless communication when the flight device is performing wireless communication with the specified base station.

The operation plan management device 1 determines whether or not the estimated value of the interference amount exceeds a predetermined allowable range when the flight device performs wireless communication with a base station while flying in the scheduled operation range. When the operation plan management device 1 determines that the estimated value of the interference amount does not exceed the predetermined allowable range, the operation of the flight device indicated by the operation plan information is allowed. Then, the operation plan management device 1 transmits to the operator terminal 2 application result information indicating permission to operate the flight device.

By doing so, the operation plan management device 1 can operate a flight device that performs good wireless communication while suppressing interference of wireless communication performed by nearby base stations with radio waves emitted by the flight device.

[Functional Configuration of Operation Plan Management Device 1]

Figure 2:
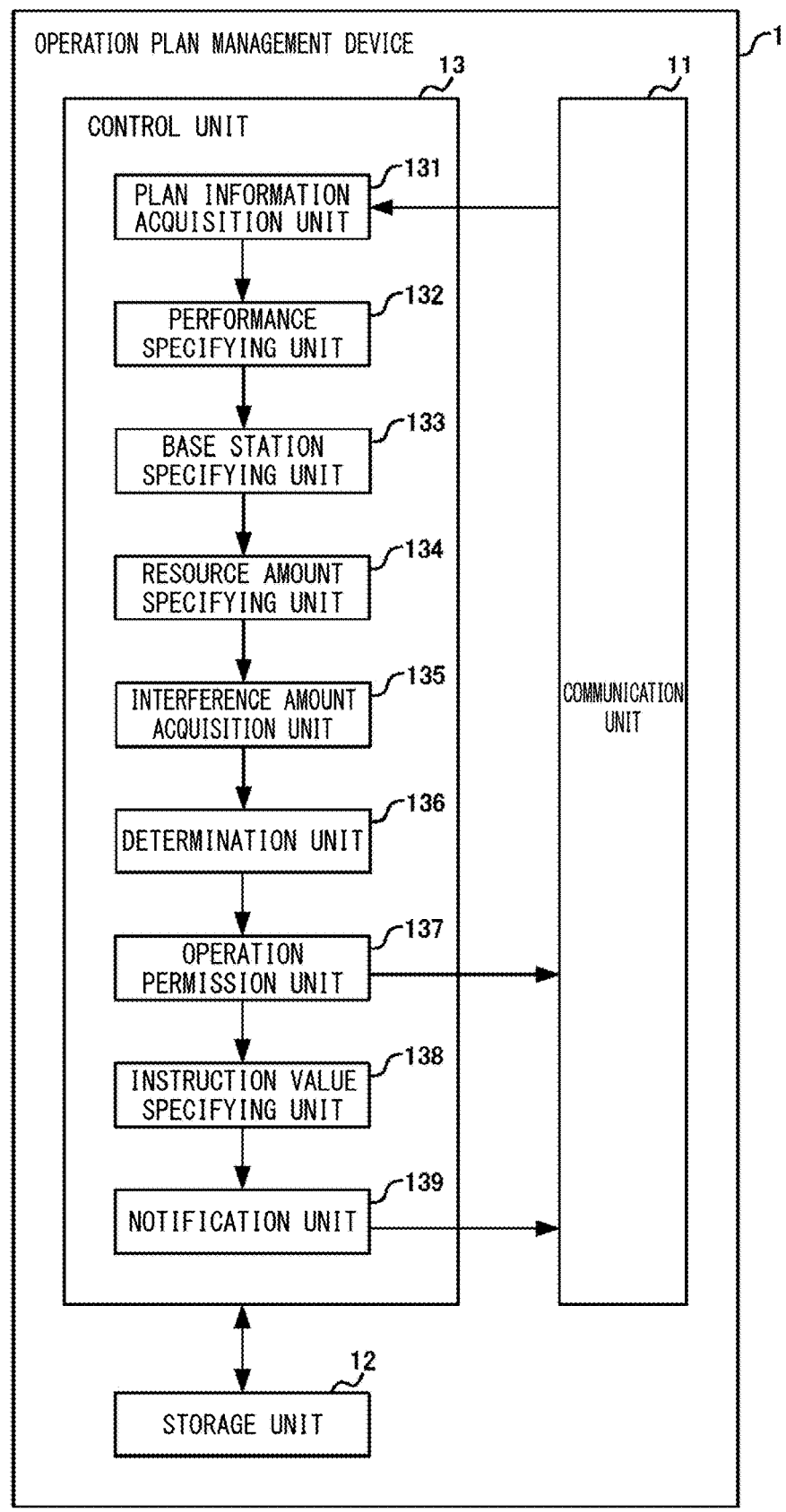
FIG. 2 is a diagram showing a functional configuration of the operation plan management device.

Next, the configuration of the operation plan management device 1 will be described in detail. FIG. 2 is a diagram showing the functional configuration of the operation plan management device 1. The operation plan management device 1 has a communication unit 11, a storage unit 12 and a control unit 13.

The communication unit 11 is a communication interface for transmitting and receiving data to and from the operator terminal 2 via a network such as the Internet.

The storage unit 12 is a storage medium that stores various types of data, and includes ROM (Read Only Memory), RAM (Random Access Memory), a hard disk, and the like. The storage unit 12 stores programs executed by the control unit 13. The storage unit 12 stores a program that causes the control unit 13 to function as a plan information acquisition unit 131, a performance specifying unit 132, a base station specifying unit 133, a resource among specifying unit 134, an interference amount acquisition unit 135, a determination unit 136, an operation permission unit 137, an instruction value specifying unit 138, and a notification unit 139.

The storage unit 12 stores operation plan information for which application has been approved among the operation plan information acquired by the operation plan management device 1. The storage unit 12 stores operation plan information corresponding to each of a plurality of flight devices scheduled to fly. FIG. 3 is a diagram showing an example of the operation plan information. As shown in FIG. 3, the operation plan information is information associated with an operator ID for identifying the operator of the flight device to be flown, a flight device ID for identifying the flight device, and an operation plan for the flight device.

The operation plan includes, for example, a module ID as module identification information, scheduled operation date and time information indicating the date and time the flight device is scheduled to fly, scheduled operation range information indicating the scheduled operation range of the flight device is scheduled to fly, use information, and required performance information.

The module ID is information for identifying the communication module by which the flight device performs wireless communication. The module ID is, for example, the model number of the communication module that the flight device has. The scheduled operation date and time information includes the scheduled operation date on which the flight device is scheduled to fly, the flight start time that is the time to start the flight, and the flight end time that is the time to end the flight. The scheduled operation date and time information may include flight times for each of one or more waypoints.

The scheduled operation range information includes a start point position indicating the point at which the flight device starts flying and an end point position indicating the point at which the flight ends. The scheduled operation range information may include the position of each of one or more waypoints. The start point position, end point position, and waypoint position include, for example, information indicating latitude and longitude. Further, the scheduled operation range information may include altitude information indicating the altitude at which the flight device flies. The altitude information may be included corresponding to each of the start point position, the end point position, and the position of each waypoint. A waypoint position is an item that can be arbitrarily registered by the operator, and does not have to be included in the operation plan information. Although the scheduled operation range information includes the start point position and the end point position, it is not limited thereto. When the flight device moves randomly in a three-dimensional space such as a cone or cube, the scheduled operation range information may define the three-dimensional space such as a cone or cube.

The use information indicates the use of the flight device in flight, and includes, for example, aerial photography, surveying, physical distribution, facility inspection, and the like. The required performance information indicates the predetermined communication performance required for the flight device in order to realize the operation of the flight device indicated by the usage application of the flight device without hindrance. Here, the communication performance is, for example, the throughput when the flight device performs wireless communication, and the predetermined communication performance indicates the desired throughput, which is the throughput required for the flight device. In this embodiment, the usage information is included in the operation plan information, but the configuration is not limited thereto, and the operation plan information need not include the usage information.

The storage unit 12 stores base station information, which is information about base stations. FIG. 4 is a diagram showing an example of base station information. As shown in FIG. 4, the base station information is information that associates at least the base station ID for identifying the base station, the communication standard (RAT) that the base station supports, the frequency band of radio waves that the base station uses for wireless communication, the modulation method, the location of the base station, the corresponding distance that is the distance covered by the base station for wireless communication, and the total amount of resources that the base station has, indicating the amount of all resources that can be allocated to the flight device. Here, an area centered on the location of the base station and having a radius equal to the corresponding distance is the coverage area of the base station.

Although omitted in the illustration, the base station information may include type information indicating the type of base station corresponding to the openness of space in the coverage area covered by the base station, such as urban, suburban, rural, etc., that is, the number of shields that shield radio waves. Also, for the sake of simplicity of explanation, the description will proceed assuming that the base station supports one frequency band and modulation method, but the base station may support a plurality of frequency bands and modulation methods.

The storage unit 12 stores resource allocation information indicating resources allocated to flight devices by the base station. FIG. 5 is a diagram showing an example of resource allocation information. As shown in FIG. 5, the resource allocation information is information that associates at least the base station ID, the time period, the flight device ID of the flight device to which the base station allocated resources in the time period, the frequency band used, the amount of resources allocated, and the transmission power parameters of the flight device.

The transmission power parameter is a combination of the transmission power initial value Pop for setting the transmission power, which is the output power when the flight device outputs radio waves, and the propagation loss compensation coefficient $\alpha_p$. Here, the subscript "p" of the transmission power initial value $P_o$ and the propagation loss compensation coefficient $\alpha$ indicates an offset value, and the greater the offset value, the lower the transmission power of the flight device. The base station transmits instruction information including the transmission power parameter to the flight device, whereby the flight device outputs transmission power on the basis of the transmission power parameter.

The control unit 13 is, for example, a CPU (Central Processing Unit). By executing programs stored in the storage unit 12, the control unit 13 functions as the plan information acquisition unit 131, the performance specifying unit 132, the base station specifying unit 133, the resource amount specifying unit 134, the interference amount acquisition unit 135, the determination unit 136, the operation permission unit 137, the instruction value specifying unit 138, and the notification unit 139. The plan information acquisition unit 131, the performance specifying unit 132, the base station specifying unit 133, the resource amount specifying unit 134, the interference amount acquisition unit 135, the determination unit 136, the operation permission unit 137, the instruction value specifying unit 138, and the notification unit 139 will be described in detail.

[Acquisition of Operation Plan Information]

First, the function related to acquisition of operation plan information will be described. The plan information acquisition unit 131 acquires, from the operator terminal 2, application data for applying for flight of the flight device, including operation plan information indicating the operation plan of the flight device scheduled for flight. By acquiring the application data, the plan information acquisition unit 131 acquires the operation plan information including the flight device ID for identifying the flight device scheduled to fly, the operator 1D of the operator of the flight device, the scheduled operation date and time information indicating the date and time the flight device is scheduled to fly, and the scheduled operation range information indicating the scheduled operation range in which the flight device is scheduled to fly.

The plan information acquisition unit 131 acquires operation plan information including the operator ID, flight device ID, module ID, scheduled operation date and time information, scheduled operation range information, use information, and required performance information, as shown in FIG. 3. In the following description, the flight device scheduled to fly corresponding to the operation plan information is referred to as the application flight device.

[Specification of Specifications of Application Flight Device]

The performance specifying unit 132 specifies the specification of the application flight device based on the module ID included in the operation plan information acquired by the plan information acquisition unit 131. Specifically, based on the module ID, the performance specifying unit 132 specifies at least one of the radio access technology (RAT), which is a communication standard for wireless communication, the frequency band used and the modulation method, as the specification for wireless communication performed by the communication module of the application flight device. For example, the storage unit 12 stores module information in which the module ID, the communication standard, the frequency band used, and the modulation method are associated with each other. The performance specifying unit 132 refers to the module information to specify the wireless communication specification performed by the communication module of the application flight device.

Further, when the acquired operation plan information includes use information and does not include required performance information, the performance specifying unit 132 may specify the desired throughput on the basis of the use indicated by the use information. For example, the storage unit 12 stores a plurality of pieces of use information in association with corresponding desired throughputs. The performance specifying unit 132 specifies the desired throughput that is stored in association with the use information as the desired throughput corresponding to the use information included in the operation plan information. In this way, the operation plan management device can specify the desired throughput even if the operator is not aware of the throughput required for the use of the application flight device and the operation plan information does not include the required performance information.

[Specification of Captured Base Station]

The base station specifying unit 133 specifies a base station that performs wireless communication with the application flight device based on the scheduled operation range included in the operation plan information acquired by the plan information acquisition unit 131. The base station specifying unit 133, referring to the base station information stored in the storage unit 12, specifies a base station whose coverage area is at least a part of the scheduled operation range indicated by the scheduled operation range information included in the operation plan information acquired by the plan information acquisition unit 131 as a base station that performs wireless communication with the application flight device. The base station specifying unit 133 specifies the base station ID of a base station that corresponds to the specifications of the application flight device specified by the performance specifying unit 132. The base station specifying unit 133 may specify a base station that performs wireless communication with the application flight device for each sector of the base station. In the following description, a base station that performs wireless communication with the application flight device specified by the base station identification unit 133 is called a captured base station.

[Specification of Allocation Resource Amount]

The resource amount specifying unit 134 specifies a new allocation resource amount, which is the wireless communication resource amount, required for realizing the desired throughput, to be allocated to the application flight device by the captured base station. The resource amount specifying unit 134 specifies the new allocation resource amount for each of the one or more captured base stations specified by the base station specifying unit 133.

Specifically, the resource amount specifying unit 134 specifies the new allocation resource amount on the basis of at least one of the communication standard corresponding to wireless communication, frequency band used, and modulation method, which are specifications of the wireless communication performed by the communication module of the application flight device, as specified by the performance specifying unit 132 based on the module ID included in the operation plan information, and the desired throughput when the application flight device performs wireless communication with the base station.

First, the resource amount specifying unit 134 calculates the radio wave intensity of received radio waves when the captured base station receives radio waves generated by the application flight device on the basis of the altitude of the applicant flight device included in the scheduled operation range indicated by the operation plan information, and specifies the throughput corresponding to the radio wave intensity. Note that the resource amount specifying unit 134 may calculate the radio wave intensity of received radio waves when the application flight device receives radio waves generated by the captured base station, and may specify the throughput corresponding to the calculated radio wave intensity.

Figure 6:
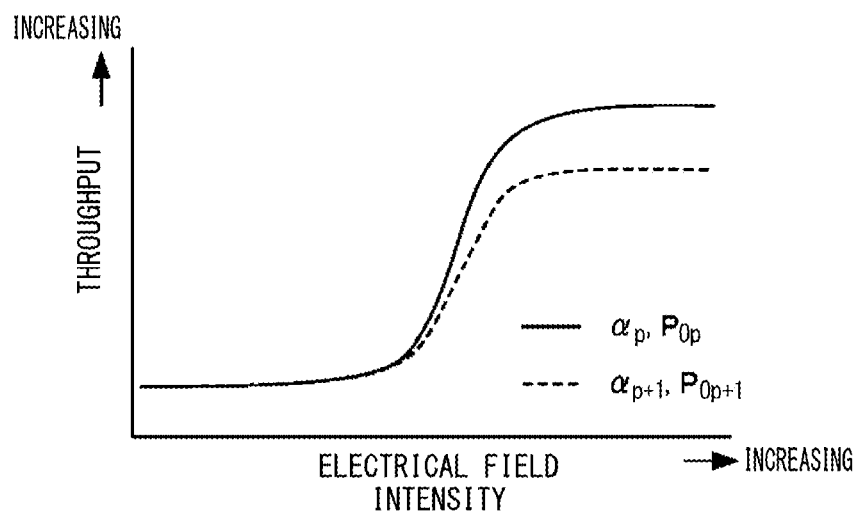
FIG. 6 is a diagram showing an example of throughput characteristic information.

The storage unit 12 stores throughput characteristic information indicating the throughput characteristic, which is the relationship between the radio wave intensity and throughput when one resource is allocated, for each the communication standard used by the flight device, the frequency band used, the modulation method, and a parameter of the transmission power of the flight device. FIG. 6 is a diagram showing an example of throughput characteristic information. FIG. 6 shows throughput characteristic corresponding to two transmission power parameters when communicating using the same communication standard, frequency band used, and modulation method.

The resource amount specifying unit 134, referring to the throughput characteristic information corresponding to the specifications specified by the performance specifying unit 132, specifies the throughput corresponding to the radio wave intensity calculated for the application flight device. When specifying the throughput for the first time in response to the acquired operation plan information, the resource amount specifying unit 134 specifies the throughput on the basis of the throughput characteristic corresponding to the initial values of the transmission power parameters of the flight device (transmission power value initial value=$P_{0default}$, propagation loss compensation factor=$\alpha_{default}$).

Upon specifying the throughput corresponding to one resource, the resource amount specifying unit 134, based on the throughput, specifies a new allocation resource amount, which is the resource amount required to satisfy the desired throughput.

In addition, the resource amount specifying unit 134 specifies an allocatable resource amount, which is the amount of resources that can be allocated to the application flight device in the captured base station specified by the base station specifying unit 133. The resource amount specifying unit 134, referring to a plurality of pieces of operation plan information stored in the storage unit 12, specifies the date and time when the application flight device is scheduled to fly as indicated by the operation plan information acquired by the plan information acquisition unit 131, and specifies other flight devices that will fly the scheduled operation range indicated by the operation plan information and communicate wirelessly with the captured base station on that date and time. The resource amount specifying unit 134 specifies the allocatable resource amount on the basis of the wireless communication resource amounts allocated to the other specified flight devices on the date and time.

Specifically, the resource amount specifying unit 134, referring to the base station information stored in the storage unit 12, specifies the total resource amount associated with the base station ID of the captured base station that performs wireless communication with the application flight device on the scheduled date and time. In addition, the resource amount specifying unit 134 refers to the resource allocation information stored in the storage unit 12 and specifies the total allocation resource amount associated with the base station ID at the scheduled date and time as the allocated resource amount allocated to the one or more other flight devices by the captured base station. The resource amount specifying unit 134 specifies the allocatable resource amount corresponding to the captured base station by subtracting the allocated resource amount from the total resource amount. The resource amount specifying unit 134 specifies the allocatable resource amount corresponding to each of the one or more captured base stations by performing the above processing for each of the one or more captured base stations specified by the base station specifying unit 133. In addition, the resource amount specifying unit 134 specifies the allocation resource amount to be allocated to each of all the flight devices, including the application flight device, that perform wireless communication with the captured base station.

[Estimation of Interference Amount]

The interference amount acquisition unit 135 acquires an estimated value of the interference amount of radio waves that the application flight device will impart to wireless communications conducted by nearby base stations, which are base stations in the vicinity of the captured base station, when the application flight device performs wireless communication with the captured base station while flying in the scheduled operation range. The interference amount acquisition unit 135 acquires the estimated value of the interference amount of radio waves when the application flight device has transmitted radio waves having a radio wave intensity corresponding to the transmission power parameter. Specifically, the interference amount acquisition unit 135 acquires the estimated value of the interference amount corresponding to the transmission power of the application flight device corresponding to the transmission power parameter by referring to the interference amount characteristic information stored in the storage unit 12, which is determined based on the transmission power when the flight device outputs radio waves. Details of the interference amount characteristic information will be described later.

It is assumed that the application flight device transmits radio waves at the transmission power that will provide the desired throughput, when the application flight device wirelessly communicates with the captured base station. Therefore, the interference amount acquisition unit 135 acquires the estimated value of the interference amount when the application flight device transmits radio waves of an intensity at which the communication performance, when the application flight device flies at the altitude indicated by the altitude information included in the operation plan information and performs wireless communication with the captured base station, satisfies the desired throughput.

The interference amount acquisition unit 135 acquires the estimated value of the interference amount corresponding to each of the one or more captured base stations that wirelessly communicate with the application flight device. As a result, the interference amount acquisition unit 135 acquires the estimated value of the interference amount for each area corresponding to each of the one or more captured base stations on the flight route on which the application flight device flies.

Figure 7:
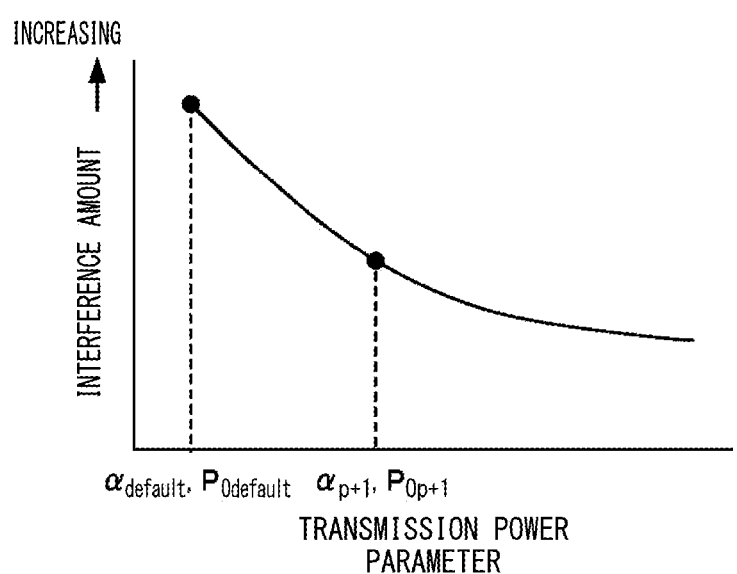
FIG. 7 is a diagram showing an example of interference amount characteristic information.

The storage unit 12 stores interference amount characteristic information indicating the relationship between the transmission power parameter and the interference amount for each communication standard, frequency band used, amount of resource usage, and altitude. FIG. 7 is a diagram showing an example of interference amount characteristic information. The example shown in FIG. 7 shows the relationship between the transmission power parameter corresponding to a combination of one communication standard, the frequency band used, resource usage amount, and altitude, and the interference amount. The interference amount characteristic information is, for example, a data table that associates transmission parameters with interference amounts. The interference amount characteristic information is created in advance by simulation, for example, based on the transmission power when the flight device outputs radio waves according to the transmission parameters.

The interference amount acquisition unit 135 refers to the interference amount characteristic information that corresponds to the communication standard corresponding to the application flight device, the frequency band used, and the new allocation resource amount allocated to the application flight device, and acquires an estimated value of the interference amount imparted to nearby base stations by the application flight device. When specifying a new allocation resource amount for the first time in response to the operation plan information, the resource amount specifying unit 134 specifies the new allocation resource amount assuming that the transmission power parameter of the flight device is an initial value, and therefore the interference amount acquisition unit 135 specifies the interference amount corresponding to the initial value of the transmission power parameter in the interference amount characteristic information.

If there is another flight device that performs wireless communication with the captured base station during the time period in which the application flight device wirelessly communicates with the captured base station, the interference amount acquisition unit 135 acquires the estimated value of the interference amount of radio waves taking into account the radio wave interference imparted by the other flight device to the wireless communication performed by the nearby base stations.

In this case, the interference amount acquisition unit 135 acquires an estimated value of the interference amount of radio waves imparted by all flight devices to the wireless communication performed by nearby base stations on the basis of the allocation resource amount allocated to each of all flight devices performing wireless communication with the captured base station, as specified by the resource amount specifying unit 134. Specifically, for each of one or more other flight devices different from the application flight device, the interference amount acquisition unit 135 specifies the specifications of the other flight device based on the module ID contained in the other flight device's operation plan information. Also, the interference amount acquisition unit 135 refers to the resource allocation information and identifies transmission power parameters corresponding to other flight devices. The interference amount acquisition unit 135, referring to the interference amount characteristic information corresponding to the specified specifications and the allocation resource amount allocated to other devices specified by the resource amount specifying unit 134, acquires an estimated value of the interference amount corresponding to the specified transmission power parameter. The interference amount acquisition unit 135 acquires an estimated value of the interference amount of radio waves imparted by all flight devices to wireless communication performed by nearby base stations by summing up all the acquired estimated values of the interference amount.

Note that the interference amount acquisition unit 135 may acquire an estimate of the interference amount of radio waves imparted by the application flight device to wireless communication performed by base stations nearby the captured base station, on the basis of the base station type corresponding to the openness of space in the area covered by the captured base station. In this case, the storage unit 12 may store interference amount characteristic information for each communication standard, base station type indicating the openness of space in the base station, frequency band used, and amount of resources used. Then, the interference amount acquisition unit 135 may refer to the base station information to specify the base station type corresponding to the captured base station, and may refer to the interference amount characteristic information corresponding to the type of the base station, the communication standard corresponding to the application flight device, the frequency band used, and the new allocation resource amount allocated to the application flight device to acquire an estimate value of the interference amount imparted to nearby base stations by the application flight device. By doing so, depending on the openness of the space corresponding to the captured base station, the estimate of the interference amount can be reduced in areas with many obstructions (e.g., downtown areas), and the estimate of the interference amount can be increased in areas with few obstructions and therefore susceptible to interference from the radio waves of the application flight device (e.g., rural areas).

[Determination of Flight Permission for Application Flight Device]

Subsequently, the determination unit 136 determines whether flight of the application flight device is permitted. The determination unit 136 determines whether the estimation value of the interference amount acquired by the interference amount acquisition unit 135 does not exceed the predetermined allowable range of the amount of wireless interference imparted by the application flight device to wireless communications conducted by the nearby base stations when the application flight device performs wireless communication with the captured base station while flying in the scheduled operation range.

Specifically, first, the determination unit 136 determines whether the captured base station can allocate resources corresponding to the new allocation resource amount to the application flight device on the basis of the allocatable resource amount specified by the resource amount specifying unit 134 and the new allocation resource amount allocated to the application flight device. Upon determining that the resources corresponding to the new allocation resource amount are allocatable, the determination unit 136 determines whether the estimated value of the interference amount acquired by the interference amount acquisition unit 135 exceeds a threshold value indicating the upper limit of a predetermined allowable range for the interference amount, and thereby determines whether the estimated value of the interference amount does not exceed the allowable range.

When the determination unit 136 determines that the estimated value of the interference amount does not exceed the allowable range, the operation permission unit 137 accepts the application data and permits operation of the application flight device. When the determination unit 136 determines that resources corresponding to the new allocation resource amount cannot be allocated, the operation permission unit 137 rejects the operation of the application flight device indicated by the application data. The processing related to permission or rejection of operation of the application flight device will be described later.

[Adjustment of Transmission Power Parameters]

In the above description, the resource amount specifying unit 134 determined whether the estimated value of the interference amount does not exceed the allowable range based on the estimated value of the interference amount when the transmission power parameter of the flight device is at the initial value. In this case, when the estimated value of the interference amount exceeds the threshold value, the determination unit 136 may determine that the estimated value of the interference amount exceeds the allowable range.

In this case, the resource amount specifying unit 134 adjusts the transmission power parameter and specifies a new allocation resource amount corresponding to the adjusted transmission power parameter. For example, the resource amount specifying unit 134 adjusts the transmission power parameter to a transmission power parameter that lowers the transmission power by one step from the transmission power before adjustment, and specifies the throughput after adjustment based on the throughput characteristic information corresponding to the adjusted transmission power parameter. On the basis of the specified throughput, resource amount specifying unit 134 then specifies an adjusted allocation resource amount, which is the new allocation resource amount after adjusting the transmission power parameter.

The determination unit 136 determines whether or not the captured base station can allocate resources corresponding to the adjusted allocation resource amount to the application flight device based on the allocatable resource amount specified by the resource amount specifying unit 134 and the adjusted allocation resource amount. When the determination unit 136 determines that the resources corresponding to the adjusted allocation resource amount cannot be allocated, the operation permission unit 137 rejects operation of the application flight device indicated by the application data.

When the determination unit 136 determines that resources corresponding to the adjusted allocation resource amount can be allocated, the interference amount acquisition unit 135 acquires an adjusted estimated value that is an estimated value of the interference amount corresponding to the adjusted transmission power parameter.

Then, by determining whether the adjusted estimated value exceeds the threshold value indicating the upper limit of the allowable range of the interference amount, the determination unit 136 re-determines whether the estimated value (adjusted estimated value) of the interference amount exceeds the allowable range. The resource amount specifying unit 134 repeats adjustment of the transmission power parameter until it is determined by the determination unit 136 that the resources corresponding to the adjusted allocation resource amount are unallocatable or the estimated value of the interference amount does not exceed the allowable range. Similarly, the interference amount acquisition unit 135 also reacquires the adjusted estimated value, and the determination unit 136 repeats the re-determination to see if the estimated value of the interference amount does not exceed the allowable range. As a result, the operation plan management device 1 can determine the amount of resources to be allocated to the application flight device and the transmission power parameter when the estimated value of the interference amount does not exceed the allowable range.

[Transmission of Application Result Data]

Upon determining that the estimated value of the interference amount does not exceed the allowable range, the operation permission unit 137 permits operation of the application flight device indicated by the operation plan information. Specifically, the operation permission unit 137 permits the flight device to operate if the determination unit 136 determines that resources corresponding to the new allocation resource amount can be allocated to the application flight device and that the estimated value of the interference amount does not exceed the allowable range. The operation permission unit 137 allows operation of the flight device when the determination unit 136 determines that resources corresponding to the new allocation resource amount are available for allocation for each of all captured base stations with which the application flight device conducts wireless communications and that the estimated value of the interference amount does not exceed the allowable range.

The operation permission unit 137 causes the storage unit 12 to store the operation plan information included in the application data acquired by the plan information acquisition unit 131 when the operation of the application flight device is permitted. Further, when permitting the application flight device to operate, the operation permission unit 137 transmits application result information including permission information indicating that operation of the application flight device has been permitted.

If the determination unit 136 determines that the estimated value of the interference amount exceeds the allowable range even after adjustment of the transmission power parameter, or if the determination unit 136 determines that the resources of the new allocation resource amount or the adjusted allocation resource amount cannot be allocated to the application flight device, the operation permission unit 137 rejects operation of the application flight device. When rejecting the operation of the application flight device, the operation permission unit 137 transmits application result information including rejection information indicating that the operation of the application flight device has been rejected.

[Specification of Resource Allocation and Transmission Power Parameter]

The instruction value specifying unit 138 specifies a designation parameter, which is a transmission power parameter that causes the application flight device to output transmission power by which communication performance is expected that is below the threshold value of the interference amount while exceeding the desired throughput, on the basis of information indicating the relationship between the communication performance of wireless communication, the interference amount, and the transmission power parameter as an instruction value instructing to cause the application flight device to output the amount of transmission power for wireless communication. The instruction value specifying unit 138 specifies the instruction value corresponding to each of all the captured base stations on the basis of estimated value of the interference amount specified for each of all the captured base stations that wirelessly communicate with the application flight device.

When it has been determined by the determination unit 136 that the estimated value of the interference amount does not exceed the allowable range, the instruction value specifying unit 138 specifies the estimated value of the interference amount used for the determination. The instruction value specifying unit 138 specifies, as the designation parameter, the transmission power parameter used for specifying the estimated value of the interference amount. In addition, the instruction value specifying unit 138 specifies a time period including the date and time when the application flight device is scheduled to perform wireless communication with the captured base station, that is, the time period during which the captured base station instructs the application flight device about the designation parameter.

The notification unit 139 notifies each captured base station, which notifies the application flight device of information indicating the designation parameter specified by the instruction value specifying unit 138, of instruction information, including time period information indicating the time period specified for the applicant flight device, for instructing the allocation of the new allocation resource amount for the application flight device and causing the captured base station to transmit the designation parameter to the application flight device. The notification unit 139 gives notice of the instruction information for causing each of the captured base stations that communicate wirelessly with the application flight device to transmit the designation parameter specified by the instruction value specifying unit 138 to the application flight device.

The instruction information includes the flight device ID of the application flight device, time period information indicating the specified time period, allocation resource amount, and the designation parameter. In addition, the notification unit 139 associates the base station ID of the captured base station, the time period included in the instruction information, the flight device ID, the new allocation resource amount, and the designation parameter, and stores them as resource allocation information in the storage unit 12. As a result, the resource allocation information corresponding to the application flight device permitted to operate is added.

When the time indicated by the time period information included in the instruction information arrives, the captured base station transmits output instruction information to the application flight device instructing that the transmission power be set to the transmission power corresponding to the designation parameter. As a result, the application flight device generates radio waves on the basis of the transmission power corresponding to the designation parameter when performing wireless communication with the captured base station, so the interference amount when performing wireless communication with the captured base station can be kept within the allowable range.

[Operation Flow]

Figure 8:
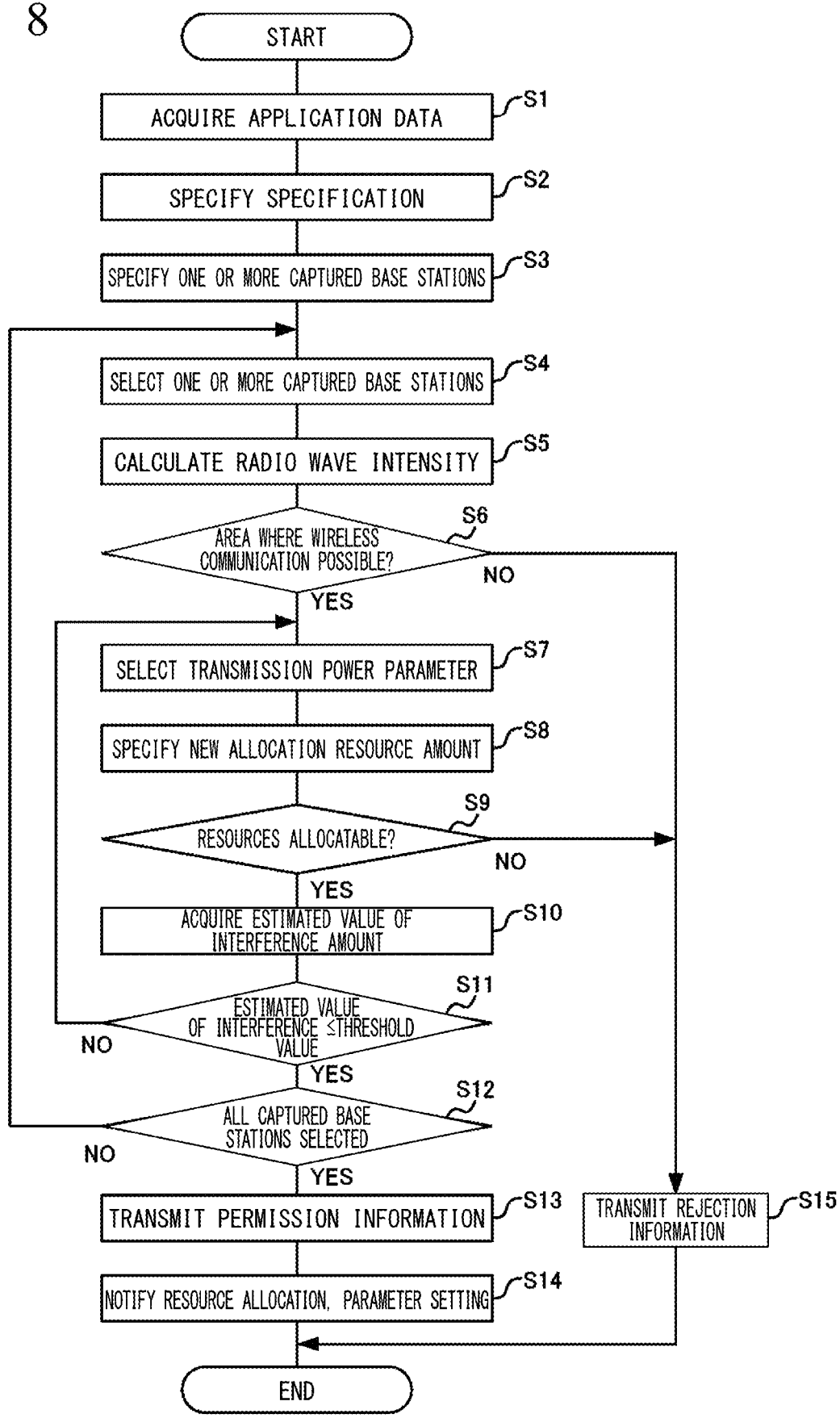
FIG. 8 is a flowchart showing the flow of processing in the operation plan management device 1.

Next, the flow of processing in the operation plan management device 1 will be described. FIG. 8 is a flowchart showing the flow of processing in the operation plan management device 1.

First, the plan information acquisition unit 131 acquires application data including operation plan information from the operator terminal 2 (S1). Subsequently, the performance specifying unit 132 specifies the specification of wireless communication performed by the communication module of the application flight device on the basis of the module ID included in the operation plan information (S2).

Subsequently, the base station specifying unit 133 specifies one or more captured base stations that perform wireless communication with the application flight device based on the scheduled operation range indicated by the operation plan information acquired by the plan information acquisition unit 131 (S3).

Subsequently, the resource amount specifying unit 134 selects one captured base station from among the one or more captured base stations specified by the base station specifying unit 133 (S4). The resource amount specifying unit 134 calculates the radio wave intensity of the radio waves generated by the application flight device when the captured base station receives the radio waves, based on the altitude of the application flight device included in the scheduled operation range indicated by the operation plan information (S5).

Subsequently, the resource amount specifying unit 134, by determining whether or not the calculated radio wave intensity exceeds a predetermined threshold value, determines whether or not the area in which the application flight device flies is an area in which wireless communication with the captured base station is possible (S6). If the resource amount specifying unit 134 determines the area to be one where wireless communication is possible, the processing proceeds to S7, and if it determines the area to be one where wireless communication is not possible, the processing proceeds to S15.

In S7, the resource amount specifying unit 134 selects the transmission power parameter of the application flight device. When selecting a transmission power parameter for the first time, resource amount specifying unit 134 selects a transmission power parameter indicating an initial value. When selecting the transmission power parameter for the second and subsequent times, the resource amount specifying unit 134 selects a transmission power parameter in which the transmission power is one step lower than the previously selected transmission power parameter.

Subsequently, the resource amount specifying unit 134 refers to the throughput characteristic information corresponding to the specification specified by the performance specifying unit 132, and specifies the throughput corresponding to the selected parameter. Then, the resource amount specifying unit 134 specifies a new allocation resource amount based on the specified throughput and the desired throughput (S8). The resource amount specifying unit 134 also specifies the allocatable resource amount.

By comparing the amount of new allocation resource amount with the allocatable resource amount, the determination unit 136 determines whether the captured base station can allocate resources corresponding to the new allocation resource amount to the application flight device (S9). If the determination unit 136 determines that the resources can be allocated, the processing proceeds to S10, and if it determines that the resources cannot be allocated, the processing proceeds to S15.

The interference amount acquisition unit 135 acquires an estimate of the interference amount of radio waves that the application flight device will impart to wireless communications conducted by nearby base stations, when the application flight device conducts wireless communication with the captured base station selected in S4 (S10). If there are other flight devices performing wireless communication with the captured base station during the time period in which the application flight device performs wireless communication with the captured base station, the interference amount acquisition unit 135 acquires an estimated value of the interference amount of radio waves imparted by all the flight devices communicating wirelessly with the captured base station to wireless communication performed by the nearby base stations.

Next, the determination unit 136 determines whether the estimated value of the interference amount does not exceed the allowable range by determining whether the estimated value of the interference amount does not exceed the upper limit of the allowable range of the interference amount (S11). If the determination unit 136 determines that the estimated value of the interference amount does not exceed the threshold value, the processing proceeds to S12, and if it determines that the estimated value of the interference amount exceeds the threshold value, the processing proceeds to S7.

Subsequently, the determination unit 136 determines whether or not all the captured base stations have all been selected, that is, whether or not the estimated value of the interference amount for each of all the captured base stations does not exceed the allowable range (S12). Upon determining that all the captured base stations have been selected, the determination unit 136 shifts the processing to S13, and upon determining that all the captured base stations have not been selected, it shifts the processing to S4.

Then, the operation permission unit 137 transmits to the operator terminal 2 application result information including permission information indicating that the flight of the application flight device based on the application data is permitted (S13).

Then, the notification unit 139 instructs the allocation of the new allocation resource amount for the application flight device, and notifies instruction information for having the designation parameter specified by the instruction value specifying unit 138 transmitted to the application flight device (S14).

In S15, the flight permission unit 137 transmits to the operator terminal 2 application result information including rejection information indicating that the application for flight of the application flight device based on the application data has been rejected.

[Modification]

In the above description, when the resource amount specifying unit 134 specifies the throughput for the first time corresponding to the acquired operation plan information, the resource amount specifying unit 134 specified the new allocation resource amount based on the throughput corresponding to the initial value of the transmission power parameter of the application flight device. Then, when the interference amount acquisition unit 135 acquires the estimated value of the interference amount for the first time corresponding to the acquired operation plan information, the interference amount acquisition unit 135 acquires the estimated value of the interference amount based on the initial value of the transmission power parameter of the application flight device. In this case, if the determination unit 136 determines that the estimated value of the interference amount does not exceed the allowable range, the application fight device may perform wireless communication with a significantly higher throughput than the desired throughput.

Therefore, when specifying the new allocation resource amount, the resource amount specifying unit 134 may specify the new allocation resource amount in the order from the transmission power parameter at which the transmission power of the application flight device is the lowest. Then, the determination unit 136 may determine whether or not the resource of the new allocation resource amount can be allocated in the order from the transmission power parameter at which the transmission power of the application flight device is the lowest. Then, when the determination unit 136 determines that resources of the new allocation resource amount are available for allocation, the interference amount acquisition unit 135 may acquire an estimated value of the interference amount based on the transmission power parameter corresponding to the determination.

Then, the instruction value specifying unit 138, on the basis of the acquired estimated value of the interference amount, may specify the transmission power parameter corresponding to the interference amount used for the determination as the designation parameter, according to the determination by the determination unit 136 that the estimated value of the interference amount does not exceed the allowable range. By doing so, the operation plan management device 1 can determine the transmission power parameter so that the throughput of the wireless communication of the application flight device meets the desired throughput and the interference amount arising from the radio waves imparted by the application flight device to nearby base stations is minimized.

[Effect of Operation Plan Management Device 1]

As described above, when the application flight device performs wireless communication with the captured base station while flying in the scheduled operation range indicated by the acquired operation plan information, the operation plan management device 1 according to the present embodiment acquires an estimated value of the interference amount that the application flight device imparts to the wireless communication performed by nearby base stations of the captured base station. The operation plan management device 1 permits operation of the application flight device indicated by the operation plan information upon determining that, when the application flight device performs wireless communication while flying in the scheduled operation range, the estimated value does not exceed the allowable range of radio wave interference imparted by the application flight device to wireless communication performed by nearby base stations. By doing so, the operation plan management device 1 can operate a flight device that performs good wireless communication while suppressing interference of wireless communication performed by nearby base stations due to radio waves emitted by the flight device.

It should be noted that this embodiment makes it possible to contribute to Goal 9, "Build resilient infrastructure, promote sustainable industrialization, and foster innovation", of the Sustainable Development Goals (SDGs) led by the United Nations.

As described above, several techniques have been proposed for information processing devices and information processing methods.

There is a problem that the radio waves emitted by the flight device for wireless communication during flight interfere with the wireless communication between base stations and ground devices around the flight device. On the other hand, when the transmission power for wireless communication of the flight device is lowered, there arises a problem of deterioration in data transmission performance. Therefore, there is a need to operate only flight devices that can ensure desired wireless communication performance while suppressing interference of wireless communication performed by nearby base stations with the radio waves emitted by the flight device.

At least one of the exemplary embodiments exhibits the effect of being able to perform good wireless communication while suppressing interference of wireless communication performed by nearby base stations with the radio waves emitted by the flight device.

While preferred embodiments of the invention have been described and illustrated above, it should be understood that these are exemplary of the invention and are not to be considered as limiting. Additions, omissions, substitutions, and other modifications can be made without departing from the scope of the present invention. For example, all or part of the device can be functionally or physically distributed and integrated in arbitrary units. In addition, new embodiments resulting from arbitrary combinations of multiple embodiments are also included in the present embodiment. Accordingly, the invention is not to be considered as being limited by the foregoing description, and is only limited by the scope of the appended claims.

What is claimed is:

1. An information processing device comprising:
a plan information acquisition unit that acquires operation plan information including flight device identification information for identifying a flight device that is scheduled to fly, scheduled operation date and time information that indicates the date and time that the flight device is scheduled to fly, and scheduled operation range information that indicates a scheduled operation range that the flight device is scheduled to fly;
a base station specifying unit that specifies a base station that performs wireless communication with the flight device on the basis of the scheduled operation range;
an interference amount acquisition unit that acquires an estimated value of the interference amount of radio waves that the flight device imparts to the wireless communication performed by nearby base stations, which are base stations in the vicinity of the base station, when a communication performance of the wireless communication in a case of the flight device performing the wireless communication while flying in the scheduled operation range satisfies a predetermined communication performance;
a resource amount specifying unit that specifies a new allocation resource amount that is required to achieve the predetermined communication performance and is an amount of wireless communication resources allocated to the flight device by the base station, and an allocatable resource amount that is an amount of resources that can be allocated to the flight device;
a determination unit that, when the flight device performs the wireless communication while flying in the scheduled operation range, determines whether the estimated value does not exceed a predetermined allowable range of interference amount of radio waves imparted by the flight device to the wireless communication performed by the nearby base stations and determines whether it is possible to allocate resources corresponding to the new allocation resource amount to the flight device on the basis of the allocatable resource amount and the new allocation resource amount specified by the resource amount specifying unit; and
an operation permission unit that permits operation of the flight device indicated by the operation plan information upon determining that the estimated value does not exceed the predetermined allowable range and determining that the resources corresponding to the new allocation resource amount can be allocated to the flight device.

2. The information processing device according to claim 1, wherein the operation plan information includes module identification information to identify a communication module for the flight device to perform the wireless communication, and
the resource amount specifying unit specifies the new allocation resource amount on the basis of at least one of the communication standard corresponding to the wireless communication, the frequency band used and the modulation method, which are specifications of the wireless communication performed by the communication module and specified on the basis of the module identification information included in the operation plan information.

3. The information processing device according to claim 1, further comprising a storage unit that stores the operation plan information corresponding to each of a plurality of flight devices,
wherein the resource amount specifying unit, referring to the plurality of pieces of operation plan information stored in the storage unit, specifies other flight devices that will fly in the scheduled operation range indicated by the operation plan information on the date and time when the flight device indicated by the operation plan information acquired by the plan information acquisition unit is scheduled to fly, and specifies the allocatable resource amount on the basis of the amount of wireless communication resources allocated to the other specified flight devices on the date and time.

4. The information processing device according to claim 2, further comprising a storage unit that stores the operation plan information corresponding to each of a plurality of flight devices,
wherein the resource amount specifying unit, referring to the plurality of pieces of operation plan information stored in the storage unit, specifies other flight devices that will fly in the scheduled operation range indicated by the operation plan information on the date and time when the flight device indicated by the operation plan information acquired by the plan information acquisition unit is scheduled to fly, and specifies the allocatable resource amount on the basis of the amount of wireless communication resources allocated to the other specified flight devices on the date and time.

5. The information processing device according to claim 1, wherein the resource amount specifying unit specifies an allocation resource amount allocated to each of all the flight devices performing the wireless communication with the base station including the flight device; and the interference amount acquisition unit acquires the estimated value of the interference amount of radio waves imparted by all the flight devices to the wireless communication performed by the nearby base stations on the basis of the allocation resource amount specified by the resource amount specifying unit and allocated to each of all the flight devices.

6. The information processing device according to claim 1, wherein the operation plan information includes use information indicating the use of the flight device in flight; and further comprising a communication performance specifying unit that specifies the predetermined communication performance on the basis of the use indicated by the use information included in the operation plan information.

7. The information processing device according to claim 1, wherein the operation plan information includes altitude information indicating the altitude at which the flight device flies; and the interference amount acquisition unit acquires the estimated value of the interference amount when the communication performance in the case of the flight device performing the wireless communication while flying at the altitude indicated by the altitude information included in the operation plan information satisfies the predetermined communication performance.

8. The information processing device according to claim 1, wherein the interference amount acquisition unit acquires the estimated value of the interference amount of radio waves imparted by the flight device to the wireless communication performed by the nearby base stations on the basis of a type of the base station corresponding to an openness of a space in an area covered by the base station.

9. The information processing device according to claim 1, further comprising:

an instruction value specifying unit that, on the basis of information indicating a relationship between the interference amount and an instruction value that instructs a transmission power amount of the wireless transmission to be output by the flight device, and a relationship between the communication performance of the wireless transmission and the instruction value, specifies the instruction value that causes the flight device to output transmission power expected to provide communication performance that is below a threshold value of the interference amount while exceeding a predetermined communication performance; and a notification unit that notifies the base station notifying the flight device of information indicating the instruction value of information for causing the flight device to transmit the instruction value.

10. The information processing device according to claim 9, wherein the interference amount acquisition unit acquires an estimate of the interference amount for each of a plurality of base stations that perform the wireless communication with the flight device;

the instruction value specifying unit specifies the instruction value corresponding to each of the plurality of base stations on the basis of the estimate of the interference amount specified for each base station; and the notification unit notifies each of the plurality of base stations of information for causing to transmit the instruction value specified for the base station.

11. An information processing method, executed by a computer, comprising:

acquiring operation plan information including flight device identification information for identifying a flight device that is scheduled to fly, scheduled operation date and time information that indicates the date and time that the flight device is scheduled to fly, and scheduled operation range information that indicates a scheduled operation range that the flight device is scheduled to fly;

specifying a base station that performs wireless communication with the flight device on the basis of the scheduled operation range;

acquiring an estimated value of the interference amount of radio waves that the flight device imparts to the wireless communication performed by nearby base stations, which are base stations in the vicinity of the base station, when a communication performance of the wireless communication in a case of the flight device performing the wireless communication while flying in the scheduled operation range satisfies a predetermined communication performance;

specifying a new allocation resource amount that is required to achieve the predetermined communication performance and is an amount of wireless communication resources allocated to the flight device by the base station, and an allocatable resource amount that is an amount of resources that can be allocated to the flight device;

determining, when the flight device performs the wireless communication while flying in the scheduled operation range, whether the estimated value does not exceed a predetermined allowable range of interference amount of radio waves imparted by the flight device to the wireless communication performed by the nearby base stations and determining whether it is possible to allocate resources corresponding to the new allocation resource amount to the flight device on the basis of the allocatable resource amount and the new allocation resource amount; and permitting operation of the flight device indicated by the operation plan information upon determining that the estimated value does not exceed the predetermined allowable range and determining that the resources corresponding to the new allocation resource amount can be allocated to the flight device.

12. An information processing device comprising:

a plan information acquisition unit that acquires operation plan information including flight device identification information for identifying a flight device that is scheduled to fly, scheduled operation date and time information that indicates the date and time that the flight device is scheduled to fly, and scheduled operation range information that indicates a scheduled operation range that the flight device is scheduled to fly;

a base station specifying unit that specifies a base station that performs wireless communication with the flight device on the basis of the scheduled operation range;

an interference amount acquisition unit that acquires, for each of a plurality of base stations that perform the wireless communication with the flight device, an estimated value of the interference amount of radio waves that the flight device imparts to the wireless communication performed by nearby base stations, which are base stations in the vicinity of the base station, when the flight device performs the wireless communication while flying in the scheduled operation range;

a determination unit that, when the flight device performs the wireless communication while flying in the scheduled operation range, determines for the each of the plurality of base stations, whether the estimated value does not exceed a predetermined allowable range of interference amount of radio waves imparted by the flight device to the wireless communication performed by the nearby base stations, by comparing a threshold value of the interference amount corresponding to the each of the plurality of base stations and the estimated value of the interference amount; and an operation permission unit that permits operation of the flight device indicated by the operation plan information upon determining for the each of the plurality of base stations that the estimated value does not exceed the allowable range.

13. An information processing method, executed by a computer, comprising:

acquiring operation plan information including flight device identification information for identifying a flight device that is scheduled to fly, scheduled operation date and time information that indicates the date and time that the flight device is scheduled to fly, and scheduled operation range information that indicates a scheduled operation range that the flight device is scheduled to fly;

specifying a base station that performs wireless communication with the flight device on the basis of the scheduled operation range;

acquiring, for each of a plurality of base stations that perform the wireless communication with the flight device, an estimated value of the interference amount of radio waves that the flight device imparts to the wireless communication performed by nearby base stations, which are base stations in the vicinity of the base station, when the flight device performs the wireless communication while flying in the scheduled operation range;

determining for the each of the plurality of base stations, when the flight device performs the wireless communication while flying in the scheduled operation range, whether the estimated value does not exceed a predetermined allowable range of interference amount of radio waves imparted by the flight device to the wireless communication performed by the nearby base stations, by comparing a threshold value of the interference amount corresponding to the each of the plurality of base stations and the estimated value of the interference amount; and permitting operation of the flight device indicated by the operation plan information upon determining for the each of the plurality of base stations that the estimated value does not exceed the allowable range.

* * * * *